United States Patent Office 2,932,454
Patented Apr. 12, 1960

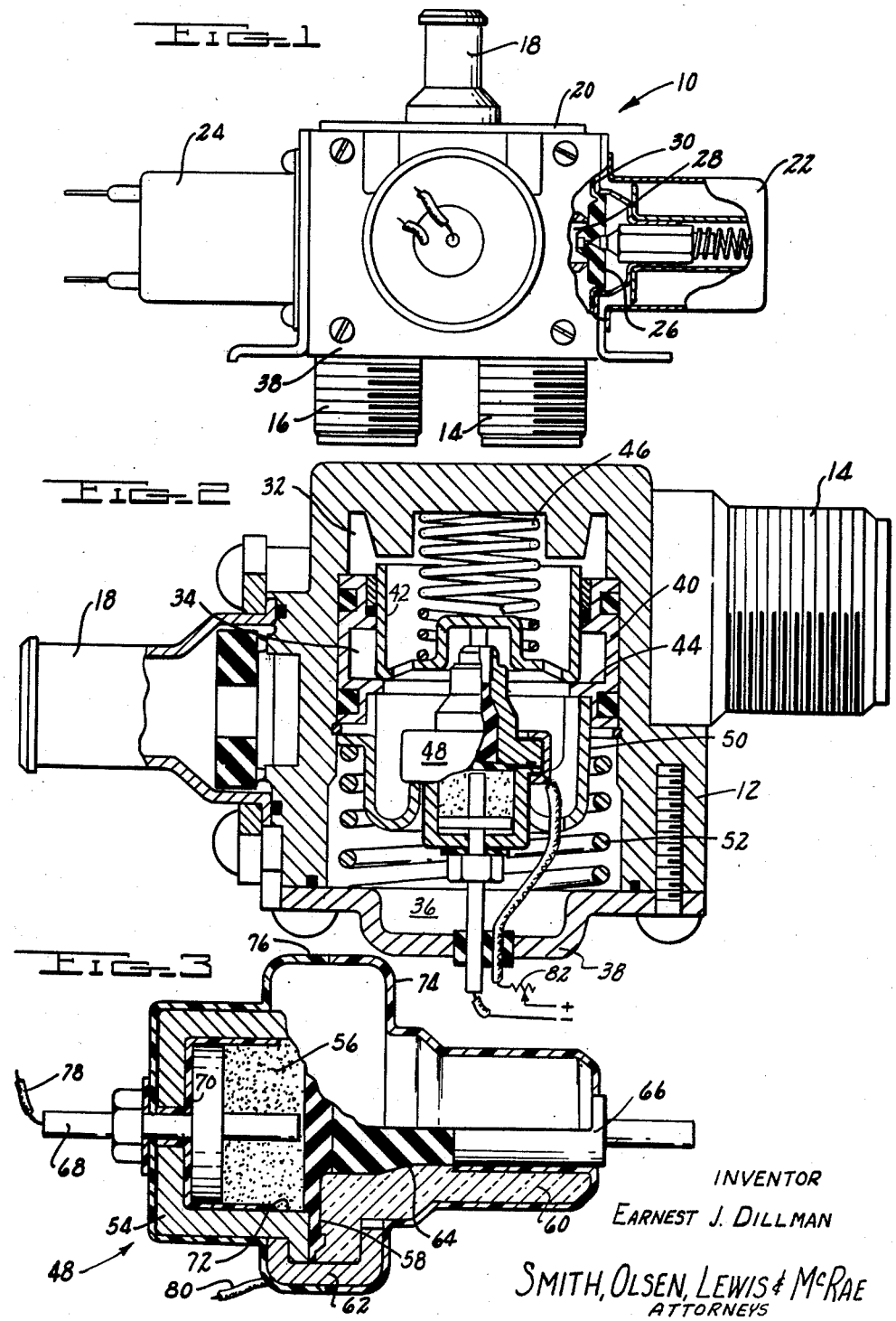

2,932,454

REMOTE CONTROL MEANS FOR THERMALLY SENSITIVE ELEMENT AND MIXING VALVE EMPLOYING SUCH MEANS

Earnest J. Dillman, Detroit, Mich., assignor, by mesne assignments, to American Radiator & Standard Sanitary Corporation, New York, N.Y., a corporation of Delaware Application March 18, 1957, Serial No. 646,617

6 Claims. (Cl. 236—12)

The present invention relates to a variable temperature mixing valve and to a temperature sensitive device having remote control means for varying the effective range of its sensitivity.

It is one object of the present invention to provide a variable temperature sensing device adapted to be adjusted from a remote position for varying the effective range of operation of such device.

It is another object of the present invention to provide a variable temperature mixing valve for mixing liquids of different temperatures including a sensing device of the foregoing character.

It is another object of the present invention to provide a thermostatically controlled variable temperature mixing valve of the foregoing character wherein the remote control means is electrically operated from a remote position.

It is another object of the present invention to provide a variable temperature mixing valve of the foregoing character wherein the sensing device has a dielectric shield preventing flow of electric current from the sensing device to the valve body, said dielectric shield also serving to slow the rate of heat transfer between the sensing device and the ambient fluid so as to increase the effectiveness of the flow of electric current in controlling the effective range of operation of the sensing device.

It is still another object of the present invention to provide a variable temperature mixing valve of the foregoing character which has a temperature sensing device inherently self-regulating in operation to prevent such temperature sensing device from being burned out.

Other objects of this invention will appear in the following description and appended claims, reference being had to the accompanying drawings forming a part of this specification wherein like reference characters designate corresponding parts in the several views.

In the drawings:

Figure 1 is a plan view, partly in section, showing a thermostatically controlled water mixing valve embodying one form of the present invention, Fig. 2 is an enlarged section of the embodiment illustrated in Fig. 1; and Fig. 3 is an enlarged sectional view of the temperature sensing device shown in Fig. 2 and embodying one form of this device.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, a more detailed description of the present invention will be given. The water mixing valve 10 includes a valve body 12 having a hot water inlet 14 and a cold water inlet 16. An outlet member 18 is secured to the opposite side of the valve body 12 by means of an outlet retainer member 20. Mounted on opposite ends of the valve body 12 are conventional solenoids 22 and 24. As shown with respect to solenoid 22, each solenoid is mounted over a fluid operated solenoid control diaphragm valve 26. Various suitable designs for the internal flow passages within the mixing valve 10 may be employed. Thus, if it is desired, the hot water may enter through the inlet 14, passing through an internal duct or passageway 28 to the diaphragm valve 26 and when the latter is raised out the passageway 30 to the outlet member 18. A second passageway (not shown) for hot water may communicate directly with an internal mixing chamber (not shown). The cold water inlet may also communicate directly with the internal mixing chamber (not shown). Another passageway may then be provided between the mixing chamber and the diaphragm valve associated with solenoid 24 so as to control the flow of the mixed fluid to the outlet member 18. It will be recognized that the flow passageways shown and described in the illustrated embodiment are similar to those found in the patent to Obermaier, 2,620,134, granted December 2, 1952.

If it is desired, the present invention may be employed in other type mixing valves wherein the hot and cold water inlets each have but a single passageway to a mixing chamber from where the mixed water can flow directly to the outlet member. In this type of valve body a fluid operated solenoid controlled diaphragm valve will be located in each of the passageways between the inlets and the mixing chamber. A patent showing internal flow passages of this general type is Lund, 2,712,324, granted July 5, 1955.

Referring now to Fig. 2, the internal portions of one suitable mixing valve will be explained. The hot water enters through the inlet 14 and flows to the hot water inlet chamber 32. In a similar fashion the cold water inlet is in direct communication with the cold water inlet chamber 34. The mixing chamber 36 is in communication with the outlet member 18 by an internal passageway (not shown). The valve body 12 is open at its one end to provide access to the mixing chamber 36. This open end is normally closed by the cover plate 38. A valve body insert 40 is carried within the mixing chamber 36 and cooperates with the valve body 12 and the metering valve member or piston 42 to form the cold inlet chamber 34 and the hot inlet chamber 32. The valve body insert 40 also provides a seat at 44 for the metering piston 42.

When the metering piston 42 is in the position shown in Fig. 2, the hot water in the inlet chamber 32 can flow above the upper end of metering piston 42 into the mixing chamber, while the cold water is closed off from the mixing chamber by the metering piston 42. A return spring 46 is operatively positioned between the valve body 12 and the metering piston 42 to urge the metering piston 42 to the position shown in Fig. 2. A temperature sensitive power element 48 which will be described in greater detail hereinafter is mounted in the mixing chamber 36 by means of a power element retainer 50 and a spring 52. The latter is operatively positioned between the retainer 50 and the cover plate 38 and also serves to accommodate override of the power element 48 when the need arises.

The temperature sensitive power element 48 is adapted to raise the metering piston 42 from its seat 44 when the temperature of the water within the mixing chamber 36 raises above a predetermined degree. Thus, it will be readily apparent that the metering piston 42 will restrict the amount of hot and cold water that enters the mixing chamber in response to action of the temperature sensitive element 48.

One of the novel features of the present invention is the manner in which the effective operating range of the temperature sensitive power element 48 can be varied. For a detailed description of the power element 48, attention is directed particularly to Fig. 3. The power element 48 has a cup 54 which contains a wax pellet 56 which may be formed of any suitable material such as polyethylene and a conductive material such as carbon black is dispersed therein. A rubber diaphragm 58 extends over the open end of the cup 54 and a piston guide 60 is fitted over the rubber diaphragm 58. A collar 62 clamps the cup 54 and the piston guide 60 together. A rubber plug 64 fits into the hollow bore of the piston guide 60 and is adapted to transfer movement of the rubber diaphragm 58 to the piston 66.

An electric terminal 68 extends through the bottom of the cup 54. A plastic lining 70 having dielectric properties lines the inner bottom and inner walls of the cup 54 with the exception of the margin 72 adjacent the upper edge of cup 54. The plastic lining 70 also extends through the opening in the bottom of cup 54 to provide a dielectric insulation between the electric terminal 68 and the cup 54.

A two-piece plastic jacket 74 having dielectric properties engages the outer surfaces of the cup 54, collar 62 and piston guide 60. These two pieces are joined together at 76 by any suitable plastic cementing operation. The jacket 74 also extends into the bore of the piston guide 60 so as to provide electric insulation between the latter and piston 66. An electric lead 78 is connected to the electrical terminal 68 and a second electric lead 80 is connected to the collar 62. Thus, when a circuit including leads 78 and 80 is energized electric current will flow from lead 78 through electric terminal 68, wax pellet 56, the cup 54, via the uninsulated portion 72, the collar 62, and back through electric lead 80. If it is desired, a rheostat 82 may be placed in series so that the current flow through the wax pellet 56 can be selectively varied.

By virtue of the construction of the power element described above, any desired current flow can be caused to flow through the wax pellet 56, and as a result of the heat generated due to the relatively high electrical resistance to current flow in the wax pellet 56, the latter will expand causing the piston 66 to be moved to a new position. This will have the effect of shifting the position of the metering piston 42 and thereafter the power element 48 will have a new range of operation for the ambient temperatures of the mixed water flowing through the mixing chamber 36. Furthermore, by varying the setting of the rheostat 82 a corresponding change in the range of operation of the power element 48 can be effected. Since the rheostat 82 can be installed in a position remote from the mixing valve 10, a simple but effective remote control means is provided for varying the effective range of operation of the mixing valve.

Another feature of the present invention is the use of the plastic jacket 74 which not only provides an electric insulation, but also is useful in controlling the rate of heat transfer between the wax pellet 56 and the water passing through the mixing chamber. Thus, on occasions it is desired to use a standard power element 48 but which will be slower in responding to the temperature of the surrounding liquid. This can be accomplished simply by using a plastic jacket having different heat transfer properties. Furthermore, by proper selection of the plastic jacket so as to slow the rate of heat transfer, the effectiveness of the electric circuit in controlling the temperature range of operation of the power element will be enhanced. This result is obtained because the electric current flow produces a relatively small amount of heat when compared to that of the flowing ambient liquids, and reducing the rate of heat transfer then increases the effect of the current flow in establishing the temperature of the wax pellet 56.

It is also to be noted that when the wax pellet 56 expands the carbon particles therein become more finely disbursed thereby reducing the current flow. Thus, the thermostatic control will not burn itself out in operation.

Having thus described my invention, I claim:

1. The combination comprising a valve body; a valve member within said valve body for controlling fluid flow therethrough; a thermostatically-operated power element within the fluid passage through said valve body so as to be subject to fluid temperature changes; said power element comprising a hollow casing having a movable wall connected with the valve member; a body of thermally expansible, electrically conductive material within said casing; said material comprising a mixture of finely divided, electrically conductive, resistive particles and solid thermally expansible, electrically non-conductive material; and means for passing an electric current through the thermally expansible body; whereby, with no current flowing through the expansible body the power element acts in one fluid temperature range to open and close the valve member, and with current flowing through the expansible body the power element acts in another fluid temperature range to open and close the valve member.

2. The combination of claim 1 and further comprising means for selectively varying the electric current flow through the expansible body so as to provide further fluid temperature ranges in which the power element is effective to open and close the valve member.

3. A variable temperature fluid mixing valve for mixing fluids of different temperatures comprising a valve body having an internal mixing chamber with inlets for the fluids of different temperatures and an outlet through which the mixed fluid can be discharged; a metering valve member operatively mounted in the mixing chamber for movement to vary the proportionate amounts of fluids entering said mixing chamber through said inlets; a power element mounted in said mixing chamber; said power element comprising a hollow casing, and a body of solid thermally expansible, electrically conductive material within said casing for effecting movement of one wall of said power element casing from an initial setting to new positions as a result of changes in temperature of the mixed fluid, said one wall being operably connected to said metering valve member for moving the latter in response to the temperature changes of the ambient fluid, thereby to apportion the incoming fluids; and means for passing an electric current through the material within the power element casing to change its temperature and thereby to establish a new initial setting for said one wall.

4. A variable temperature fluid mixing valve for mixing fluids of different temperatures comprising a valve body having an internal mixing chamber with inlets for the fluids of different temperatures and an outlet through which the mixed fluid can be discharged; a metering valve member operatively mounted in the mixing chamber for movement to vary the proportionate amount of fluids entering said mixing chamber through said inlets; a power element mounted in said mixing chamber; said power element comprising a hollow casing, and a body of solid, softenable thermally expansible material therewithin for effecting movement of one wall of said power element casing from an initial setting to new positions as a result of changes in temperature of the mixed fluid; said one wall of the casing being operably connected to said metering valve member for moving the latter in response to the temperature changes of the ambient fluid, thereby to apportion the incoming fluids; and electric heater means for supplying heat to the expansible material independently of the heat from the mixed fluid to thereby establish a new initial setting of said one wall.

5. A variable temperature mixing valve for mixing hot and cold liquids comprising a valve body having an internal mixing chamber, separate hot and cold water inlet passageways communicating with said mixing chamber and a discharge passageway in communication with said mixing chamber through which the mixed water can flow; a by-pass passageway communicating between one of said inlet passageways and said outlet passageway; a solenoid operated diaphragm valve in said by-pass passageway for controlling flow of liquid therethrough; a second solenoid operated diaphragm valve in said outlet passageway for controlling flow of the mixed liquid from said mixing chamber; a metering valve member operatively mounted in the mixing chamber for movement to vary the proportion of hot and cold liquids entering the mixing chamber; a power element mounted in said mixing chamber; said power element comprising a hollow casing, and a body of solid thermally expansible, electrically conductive material within said casing for effecting movement of one wall of said power element casing from an initial setting to a new position resulting from a change in temperature of the mixed liquid; said one wall being operatively connected to said metering valve member for moving the latter in response to a temperature change of the ambient liquid thereby to apportion the incoming liquids; means for passing an electric current through said solid thermally expansible, electrically conductive material to change its temperature and thereby to establish a new initial setting for said one wall; remote control means external of said valve body for selectively varying the electric current that can pass through said expansible material so as to introduce heat from a separate source than the ambient fluid thereby varying the effective range of operation of said power element; and a dielectric shield encasing the electrically conductive portions of the power element so as to isolate said portions from the mixing chamber fluid.

6. The combination comprising a fluid mixing valve having hot and cold inlets, and a mixing chamber; a metering valve for apportioning the flow of hot and cold fluids into said mixing chamber; a single thermostatic power element located substantially entirely within the mixing chamber and responsive to mixed fluid temperature to mechanically operate the metering valve; and electric heater means for supplying heat to the power element independently of the heat from the mixed fluid to thereby vary the initial temperature setting of the power element.

References Cited in the file of this patent

UNITED STATES PATENTS

| | | |
|---|---|---|
| 1,314,376 | Swan | Aug. 26, 1919 |
| 2,061,536 | Dillman | Nov. 17, 1936 |
| 2,112,750 | Price | Mar. 29, 1938 |
| 2,129,477 | Parks | Sept. 6, 1938 |
| 2,278,911 | Breckenridge | Apr. 7, 1942 |
| 2,489,896 | Kempton | Nov. 29, 1949 |
| 2,498,864 | Root | Feb. 28, 1950 |
| 2,620,134 | Obermaier | Dec. 2, 1952 |
| 2,636,776 | Vernet | Apr. 28, 1953 |
| 2,815,642 | Sherwood | Dec. 10, 1957 |